United States Patent
Tougou (10) Patent No.: US 8,073,405 B2
(45) Date of Patent: Dec. 6, 2011

(54) MIMO TRANSMITTER

(75) Inventor: Hitomaro Tougou, Yokohama (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 12/666,283

(22) PCT Filed: Jul. 5, 2007

(86) PCT No.: PCT/JP2007/063488
§ 371 (c)(1),
(2), (4) Date: Dec. 22, 2009

(87) PCT Pub. No.: WO2009/004733
PCT Pub. Date: Jan. 8, 2009

(65) Prior Publication Data
US 2010/0184393 A1    Jul. 22, 2010

(51) Int. Cl.
*H04B 1/02* (2006.01)
*H03C 7/02* (2006.01)

(52) U.S. Cl. .......... 455/101; 455/115.3; 455/127.2; 375/297; 375/299

(58) Field of Classification Search ........ 455/67.11, 455/101, 115.1, 115.3, 127.1, 127.2; 375/297, 375/299
See application file for complete search history.

(56) References Cited

U.S. PATENT DOCUMENTS

| | | | |
|---|---|---|---|
| 7,340,228 B2 * | 3/2008 | Monroe et al. | 455/127.1 |
| 7,706,250 B2 * | 4/2010 | Olgaard et al. | 370/208 |
| 2005/0239488 A1 * | 10/2005 | Ebiko | 455/522 |

FOREIGN PATENT DOCUMENTS

| | | |
|---|---|---|
| JP | 2004-173258 A | 6/2004 |
| JP | 2005-525727 A | 8/2005 |
| JP | 2006-311485 A | 11/2006 |
| JP | 2006-345066 A | 12/2006 |
| JP | 2007-158913 A | 6/2007 |
| WO | 2003/065573 A1 | 8/2003 |

OTHER PUBLICATIONS

International Search Report, mailed Aug. 7, 2007, issued in corresponding International Application No. PCT/JP2007/063488, filed Jul. 5, 2007.

* cited by examiner

*Primary Examiner* — Quochien B Vuong
(74) *Attorney, Agent, or Firm* — Seed IP Law Group PLLC (57) ABSTRACT

A MIMO transmitter capable of highly efficient power amplification over a wide dynamic range or for a high PAPR signal. In the MIMO transmitter (100), an amplifier (150) amplifies an input signal and outputs the amplified signal to an antenna (170). An amplifier (160) amplifies an input signal and outputs the amplified signal to an antenna (180). A peak detection part (130) detects an envelope of a first transmission sequence. A branch switching part (140) switches over to input all of the first transmission sequence to the amplifier (150) or to input part of the first transmission sequence together with a second transmission sequence to the amplifier (160) based on comparison results between the envelope detection result of the first transmission sequence and a threshold value. This constitution can reduce a peak of the input signal of the amplifier, and thus the amplifier can be efficiently used. As a result, the MIMO transmitter capable of highly efficient power amplification for a high PAPR signal and the like can be realized.

4 Claims, 6 Drawing Sheets

MIMO TRANSMITTER

TECHNICAL FIELD

The present invention relates to a MIMO transmitting apparatus adopting Multiple Input Multiple Output (MIMO) technique of receiving by a plurality of antennas a radio signal transmitted from a plurality of antennas and carrying out radio communication.

BACKGROUND ART

As mobile and stationary radio communication is promoted to broadbandaization in the future, a large-sized base station apparatus, or short duration and heat radiation of a mobile terminal's battery according to an increase in power consumption of a power amplifier become a big problem. For this reason, a power amplifier is required to be capable of amplifying a high speed signal having a wide bandwidth with low distortion and high efficiency.

Methods of realizing high-efficiency modulation and amplification include a Doherty amplification scheme, an ET (Envelope tracking) scheme, an EER (Envelope Elimination Restoration) scheme and so on.

Meanwhile, to increase the transmission capacity of a transmission signal, a M-ary modulation scheme such as QAM (Quadrature Amplitude Modulation) is adopted.

Further, to increase frequency spectrum efficiency, an OFDM scheme (Orthogonal Frequency Division Multiplexing), whereby multicarrier signals are mapped densely in the frequency domain, is adopted.

Furthermore, large capacity transmission is possible by MIMO (Multi Input Multi Output) transmission scheme using a plurality of antennas.

Figure 1:
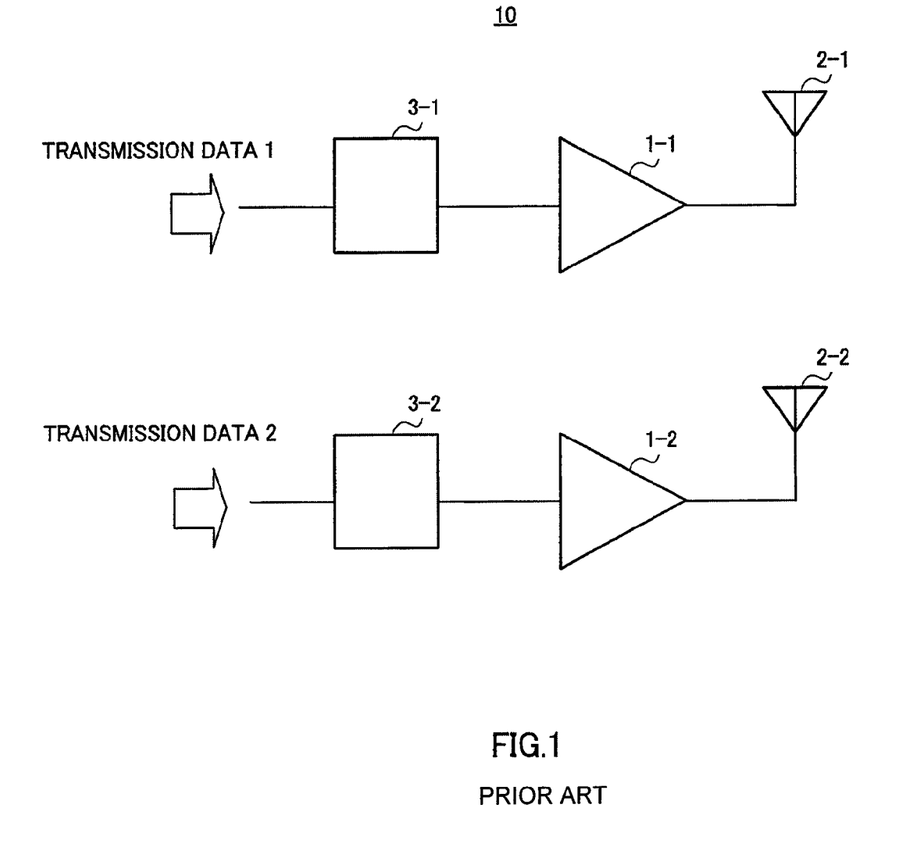
FIG. 1 is a block diagram showing a configuration of a conventional MIMO transmitting apparatus.

FIG. 1 shows a configuration of a transmitting apparatus adopting a 2×2 MIMO transmission scheme. As shown in the figure, transmitting apparatus 10 has two transmission systems each configured with power amplifier 1, antenna 2 and signal generator 3. Signal generator 3-1 receives transmission data 1 and performs radio processing including up-conversion on transmission data 1, to generate a radio signal sequence. Power amplifier 1-1 receives the radio signal sequence generated in signal generator 3-1 and amplifies this radio signal sequence. The amplified radio signal sequence is transmitted via antenna 2-1. The same processing is performed on transmission data sequence 2 in the other transmission system.

Incidentally, by employing the above M-ary modulation scheme and OFDM scheme, an envelop signal of a radio transmission signal sequence tends to fluctuate significantly. That is, the signal tends to be a wide dynamic range signal. This fluctuation width of this envelop signal is represented by an indicator referred to as "PAPR" (Peak-to-Average-Power-Ratio). Generally, when PAPR is high, it is necessary to increase the back-off of an amplifier, and therefore the efficiency of an amplifier decreases. For this reason, it is important to maintain the efficiency of an amplifier high even in a wide dynamic range signal.

Figure 2:
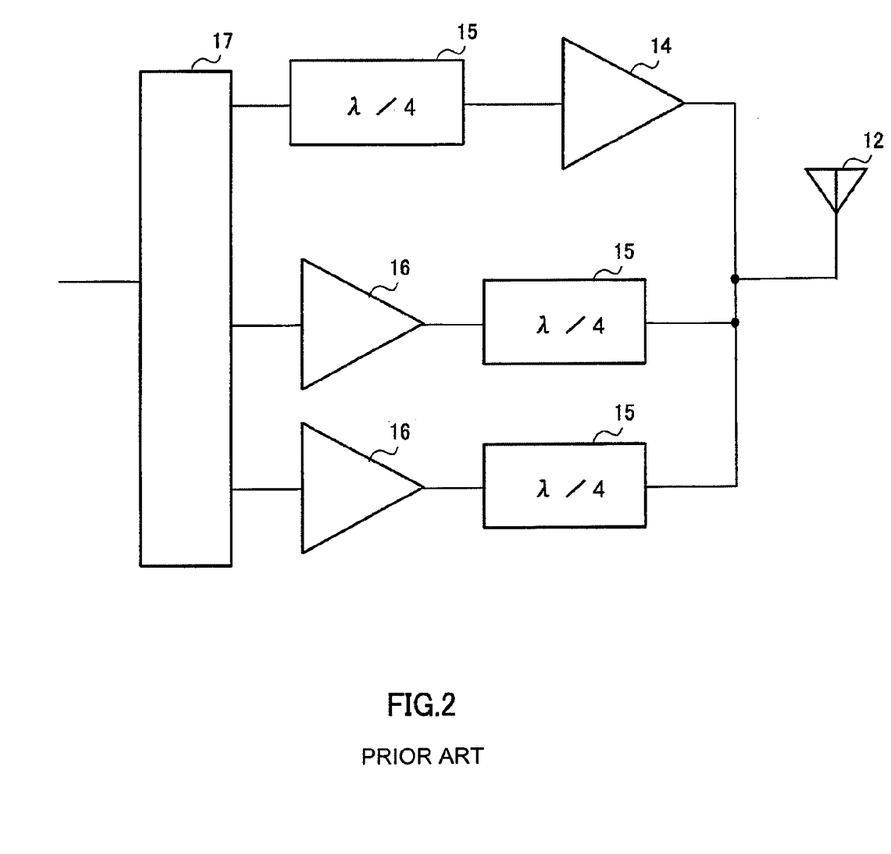
FIG. 2 is a block diagram showing a configuration of a transmitting apparatus to which a conventional high-efficiency Doherty amplification scheme is adopted.

FIG. 2 is a block diagram showing the configuration of a transmitting apparatus adopting the high-efficiency Doherty amplification scheme disclosed in Patent Document 1.

In this transmitting apparatus, a plurality of peak amplifiers 16 are disposed in parallel with one carrier amplifier 14. Splitter 17 splits a signal received as input into a plurality of signals. Further, splitter 17 changes the signal level ratio of a plurality of split signals. By this means, it is possible to set up different input levels in which a plurality of peak amplifiers 16 turn on between a plurality of peak amplifiers 16. In this way, different peak amplifiers are allowed to operate in a saturation mode according to signal levels, and this makes it possible to operate amplifiers with high efficiency even in a wide dynamic range.

Patent Document 1: Japanese Translation of a PCT Application Laid-Open No. 2005-525727

DISCLOSURE OF INVENTION

Problems to be Solved by the Invention

However, with the conventional technique, there is a given limit to amplify a signal having high PAPR with high efficiency. For example, the transmitting apparatus disclosed in Patent Document 1 needs to have a plurality of amplifiers for one transmission system, and therefore there is a problem that the circuit scale becomes greater when PAPR is higher.

It is therefore an object of present invention to provide a MIMO transmitting apparatus that allows high-efficiency power amplification even in a signal with a wide dynamic range or high PAPR.

Means for Solving the Problem

The MIMO transmitting apparatus of the present invention adopts a configuration including: a first antenna and a second antenna; a first amplifier that amplifies a signal received as input, to output the amplified signal to the first antenna; a second amplifier that amplifies a signal received as input, to output the amplified signal to the second antenna; a detection section that detects an envelop of a first transmission sequence signal; and a switching section that switches between inputting an entirety of the first transmission sequence signal to the first amplifier, and inputting part of the first transmission sequence signal provided by dividing power of the first transmission sequence signal to the second amplifier with a second transmission sequence signal based on a comparison result between the envelop detection result of the first transmission sequence signal and a threshold value.

Advantageous Effects of Invention

According to the present invention, it is possible to provide a MIMO transmitting apparatus that allows high-efficiency power amplification even in a signal with a wide dynamic range or high PAPR.

BEST MODE FOR CARRYING OUT THE INVENTION

Now, embodiments of the present invention will be described in detail with reference to the accompanying drawings. In embodiments, components having the same functions will be assigned to the same reference numerals and overlapping descriptions will be omitted. Further, although each embodiment will be premised upon 2×2 MIMO transmission, the present invention is not limited to this.

Embodiment 1

Figure 3:
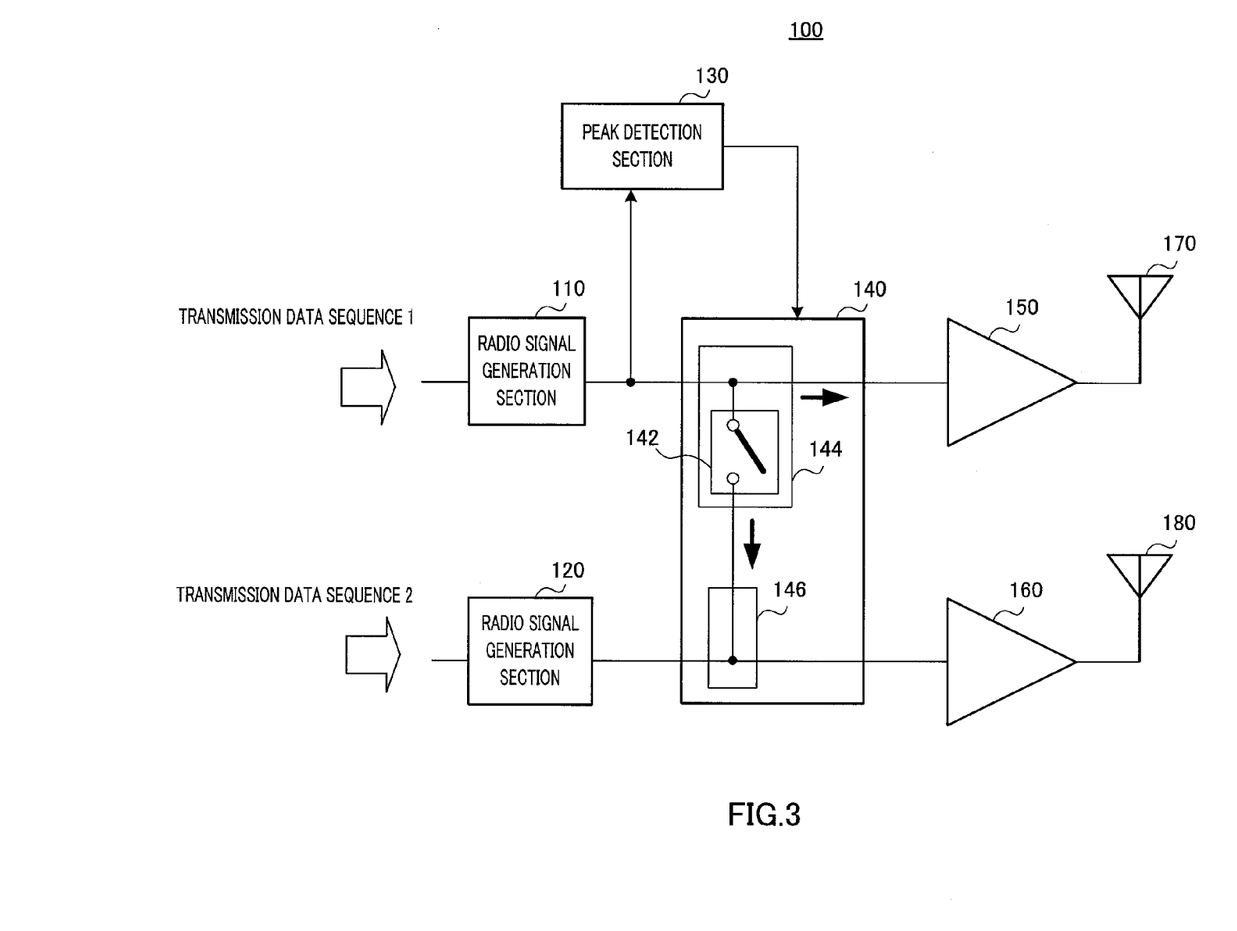
FIG. 3 is a block diagram showing a configuration of the MIMO transmitting apparatus according to Embodiment 1 of the present invention.

As shown in FIG. 3, MIMO transmitting apparatus 100 has radio signal generation sections 110 and 120, peak detection section 130, branch switching section 140, amplifiers 150 and 160, and antennas 170 and 180.

Radio signal generation section 110 receives transmission data sequence 1 as input, and performs modulation processing and radio processing (e.g. up-conversion) on transmission data sequence 1, to generate the first transmission sequence in a radio frequency.

Radio signal generation section 120 receives transmission data sequence 2 as input, and performs modulation processing and radio processing (e.g. up-conversion) on transmission data sequence 2, to generate a second transmission sequence in a radio frequency.

Peak detection section 130 detects the envelope of the first transmission sequence outputted from radio signal generation section 110. Further, peak detection section 130 detects peak values (maximum values) of the detected envelope. Peak detection section 130 detects a peak value every unit period having a width of a predetermined time. Further, peak detection section 130 compares the detected peak value and a threshold set in advance, and outputs this comparison result to branch switching section 140.

Here, the first transmission sequence is a division per unit period of a signal sequence. In this unit period, a channel condition for MIMO transmission can be considered approximately constant. For example, this unit period may be an OFDM symbol period or a plurality of OFDM symbol periods when OFDM modulation is adopted.

Based on the comparison result from peak detection section 130, branch switching section 140 switches between inputting the entire first transmission sequence to amplifier 150 and inputting part of the first transmission sequence together with a second transmission sequence to amplifier 160.

Branch switching section 140 has division section 144 having switch 142 and combination section 146. Switch 142 of division section 144 turns on and off according to the comparison result from peak detection section 130.

To be more specific, switch 142 turns on when the comparison result shows that the threshold value is greater than the peak value. In this way, part of the first transmission sequence is in condition to be inputted to combination section 146.

On the other hand, switch 142 turns off when the comparison result from peak detection section 130 shows that the peak value is equal to or smaller than the threshold value. In this way, the entire first transmission sequence is in condition to be inputted to amplifier 150.

Combination section 146 combines the first signal sequence and the second signal sequence received as input, and outputs the resulting combined signal to amplifier 160.

Amplifier 150 amplifies the input signal and outputs the amplified signal to antenna 170.

Amplifier 160 amplifies the input signal and outputs the amplified signal to antenna 180.

Next, the operations of MIMO transmitting apparatus 100 having the above configuration will be explained.

As described above, when the peak value detected in a unit period is equal to or smaller than the threshold, switch 142 in branch switching section 144 turns off in that unit period. During the period this switch 142 turns off, the entire first transmission sequence is transmitted via amplifier 150 and antenna 170. During the period this switch 142 turns off, the second transmission sequence is transmitted via branch switching section 140, amplifier 160 and antenna 180, without being combined with the first transmission sequence. That is, in this case, MIMO transmitting apparatus 100 carries out 2×2 MIMO transmission as in a conventional case.

On the other hand, when the peak value detected in a unit period is greater than the threshold, switch 142 in branch switching section 140 turns on in that unit period. During the period this switch 142 turns on, part of the first transmission sequence is inputted to combining section 146.

Here, assume that the power of the first transmission sequence is P. In division section 144, the power of the first transmission sequence is divided into power P1 and power P2. That is, the relationship P1+P2=P holds. The first transmission sequence formed in division section 144 and having power P1 is inputted to amplifier 150. Meanwhile, the first transmission sequence having power P2 is inputted to amplifier 160, together with a second transmission sequence, which is originally inputted to amplifier 160. To be more specific, prior to being inputted to amplifier 160, the first transmission sequence having power P2 is combined with the second transmission sequence in the combination section, and then is inputted to amplifier 160.

In this way, it is possible to amplify part of the first transmission sequence having a peak value greater than a threshold value using amplifier 160, which is a different from amplifier 150 that usually amplifies the first transmission sequence, and which amplifies a second transmission sequence different from the first transmission sequence. For this reason, peak values of the first transmission sequence inputted to amplifier 150 usually amplifying the first transmission sequence can be reduced, so that it is possible to set up the smaller back-off of amplifier 150. As a result, high-efficiency amplifier 150 is made possible.

the peak in the combined signal is likely to increase as a result of combining the first transmission sequence having power P2 and the second transmission sequence. However, a peak is produced in a very short period of time in a unit period, and therefore the position of a peak in the first transmission sequence and the position of a peak in the second transmission sequence are little likely to match by chance. Consequently, it is not necessary to increase the back-off of amplifier 160.

Further, here, channel condition in MIMO transmission varies as to whether or not the first transmission sequence is divided. Assume that the elements of propagation matrix H0 are h011, h012, h021 and h022 when the first transmission sequence is not divided.

If so, the elements of propagation matrix H in the case where the first transmission sequence is divided are as follows if the division ratio between P1 and P2 is a:b (a+b=1).

h11=a·h011+b·h012
h12=h012
h21=a·h021+b·h022
h22=h022

Therefore, when the first transmission sequence is divided, the propagation matrix changes. Then, it is necessary for a receiving side to carry out MIMO reception according to variation of channel conditions. Generally in transmission of an OFDM signal using MIMO, in many cases, each OFDM symbol includes a pilot signal for MIMO reception, so that MIMO reception is possible regardless of whether or not the first transmission sequence is split.

For ease of explanation, although a case has been explained above where only the first transmission sequence is subject to peak detection processing and part of the first transmission sequence is amplified in amplifier 160 and transmitted with the second transmission sequence, by providing one more set of a peak detection section and a branch switching section in MIMO transmitting apparatus 100, the second transmission sequence may be subject to peak detection processing and part of the second transmission sequence may be amplified in amplifier 150 with the first transmission sequence.

Further, although a case has been explained above assuming that the peak detection section and the branch switching section are configured with analog circuitry, the peak detection processing and the branch switching processing may be made possible using digital processing.

Further, although 2×2 MIMO has been explained as an example above, n×n MIMO transmission (n>2) is also applicable. In this case, the first transmission sequence may be distributed to three or more antennas and transmitted.

Further, any types of amplifiers including Doherty amplifiers and ET/EER amplifiers may be applicable to amplifiers 150 and 160.

In this way, according to the present embodiment, MIMO transmitting apparatus has: antennas 170 and 180; amplifier 150 that amplifies a signal received as input and outputs the amplified signal to antenna 170; amplifier 160 that amplifies a signal received as input and outputs the amplified signal to antenna 180; peak detection section 130 that detects the envelope of the first transmission sequence; and branch switching section 140 that switches between inputting the entire first transmission sequence to amplifier 150, and inputting part of the first transmission sequence provided by dividing power of the first transmission sequence, together with the second transmission sequence to amplifier 160 based on the comparison result between the envelop detection result of the first transmission sequence and a threshold.

By this means, peak values of the first transmission sequence inputted to amplifier 150 usually amplifying the first transmission sequence can be reduced, so that it is possible to set up the smaller back-off of amplifier 150. That is, when a peak of a transmission signal is high, by inputting transmission signals acquired by dividing power of a transmission signal to amplifiers corresponding to antennas, respectively, it is possible to reduce peaks of input signals to the amplifiers. As a result, high-efficiency amplifier 150 is made possible. In this way, it is possible to realize a MIMO transmitting apparatus that allows high-efficiency power amplification even in a signal with a wide dynamic range or high PAPR.

When the envelope detection result exceeds a threshold value, branch switching section 140 inputs part of the first transmission sequence to amplifier 160 such that the envelope of the first transmission sequence inputted to amplifier 150 does not exceed a threshold value.

Embodiment 2

Figure 4:
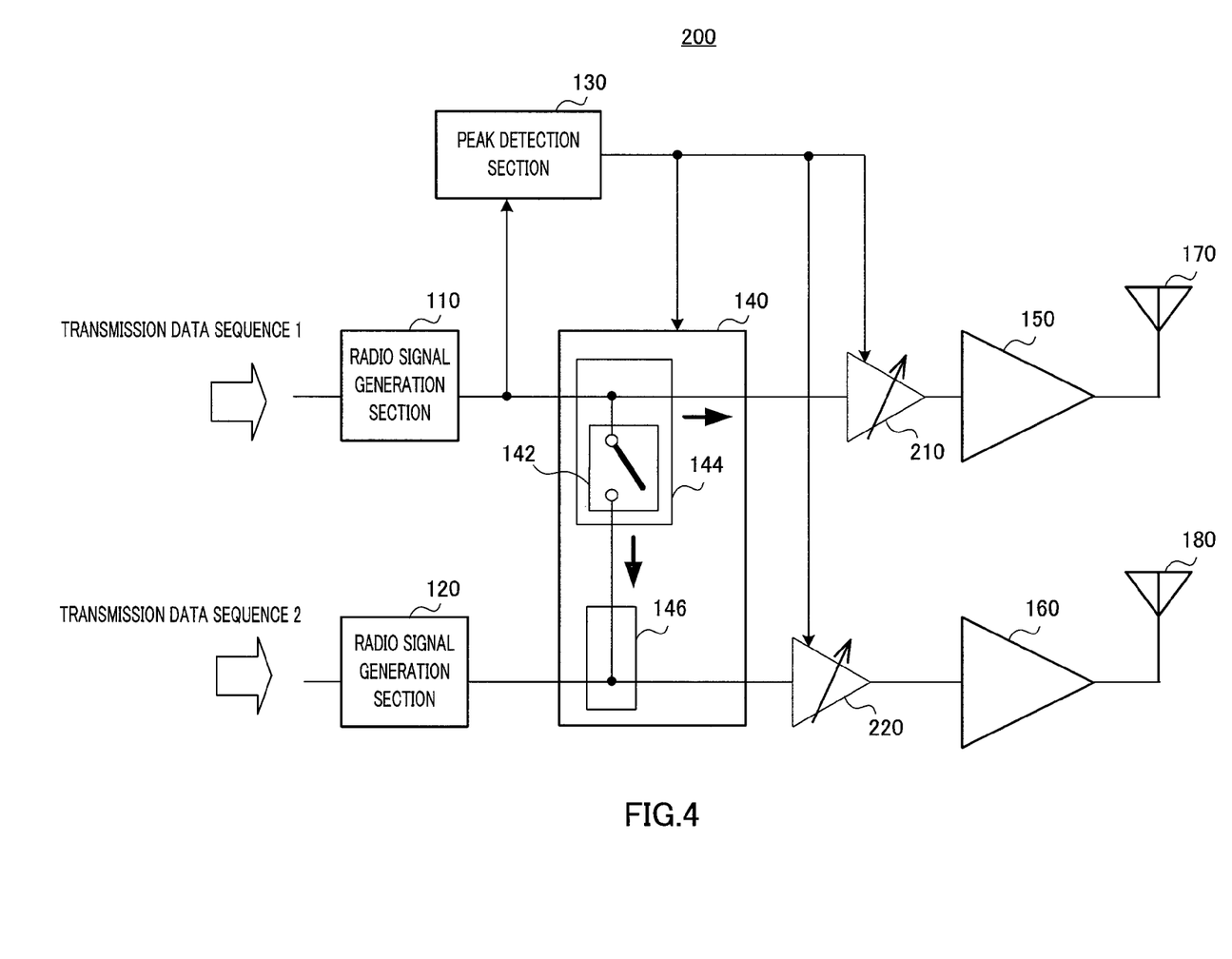
FIG. 4 is a block diagram showing a configuration of the MIMO transmitting apparatus according to Embodiment 2 of the present invention.

As shown in FIG. 4, MIMO transmitting apparatus 200 has variable amplifier 210 provided on the input side of amplifier 150 and variable amplifier 220 provided on the input side of amplifier 160.

Variable amplifier 210 receives the comparison result from peak detection section 130 and switches the gain according to this comparison result.

To be more specific, variable amplifier 210 sets greater gain when the comparison result shows that the peak value is greater than the threshold value, than the gain when the comparison result shows that the peak value is equal to or less than the threshold value.

Variable amplifier 220 receives the comparison result from peak detection section 130 and switches the gain according to this comparison result. To be more specific, variable amplifier 220 sets greater gain when the comparison result shows that the peak value is greater than the threshold value, than the gain when the comparison result shows that the peak value is equal to or less than the threshold value.

Next, the operations of MIMO transmitting apparatus 200 having the above configuration will be explained.

As described in Embodiment 1, when the peak value detected in a unit period is greater than the threshold, switch 142 in branch switching section 140 turns on in that unit period. During the period this switch 142 turns on, part of the first transmission sequence is inputted to combining section 146. For this reason, the first transmission sequence inputted to amplifier 150 is divided and has a smaller power value accordingly. Meanwhile, in combination section 146, combination loss occurs when part of the first transmission sequence and a second transmission sequence are combined.

Further, when the peak value detected in a unit period is greater than the threshold, variable amplifiers 210 and 220 set greater gain than the gain when the peak value is equal to or less than the peak value. By this means, it is possible to compensate for the power reduction and combination loss due to the above-described division.

Embodiment 3

Figure 5:
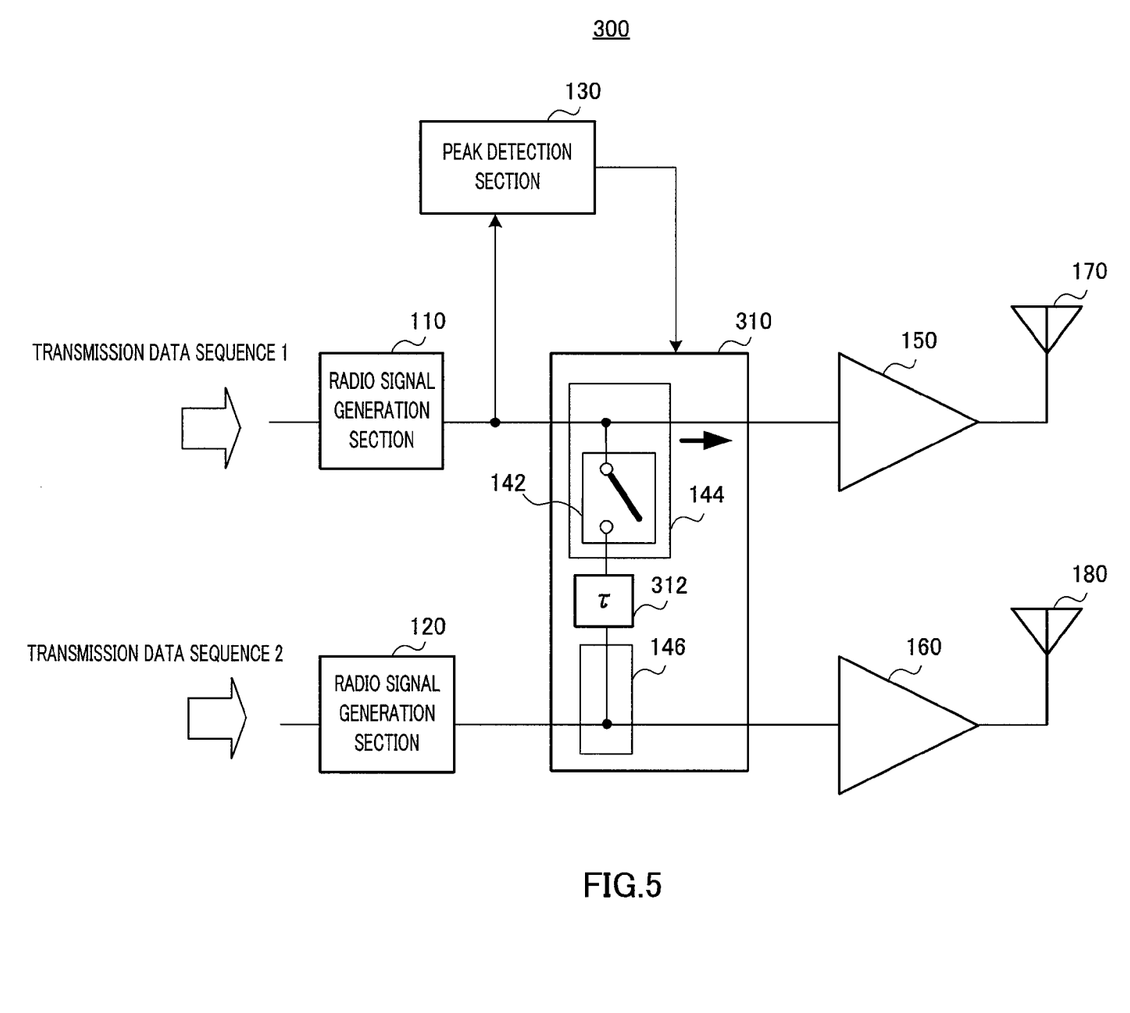
FIG. 5 is a block diagram showing a configuration of the MIMO transmitting apparatus according to Embodiment 3 of the present invention.

As shown in FIG. 5, MIMO transmitting apparatus 300 according to the present embodiment has branch switching section 310. This branch switching section 310 has delay addition section 312.

Delay addition section 312 is arranged between division section 144 and combination section 146. Delay addition section 312 gives a delay to part of the first transmission sequence divided in division section 144.

By adopting this configuration, the first transmission sequence transmitted via antenna 170 and the first transmission sequence transmitted via antenna 180 are transmitted with a relative phase difference. By this means, it is possible to reduce to lower received level of the first transmission sequence on the receiving side, due to mutual interfering between the first transmission sequence transmitted via antenna 170 and the first transmission sequence transmitted via antenna 180 on the channel path.

Duration of delay with which the first transmission sequence transmitted via antenna 170 and the first transmission sequence transmitted via antenna 180 are relatively shifted, may be applicable within a guard interval length having several microseconds to several tens of microseconds, for example, in OFDM modulation.

Furthermore, although a case has been explained above where delay addition section 312 is arranged such that the first transmission sequence transmitted via antenna 170 delays in time compared with the first transmission sequence transmitted via antenna 180, the present invention is not limited to this, and the delay addition section may be arranged on the input line of amplifier 150. That is, the phase of the first transmission sequence transmitted via antenna 170 and the phase of the first transmission sequence transmitted via antenna 180 may need to be shifted relatively.

Figure 6:
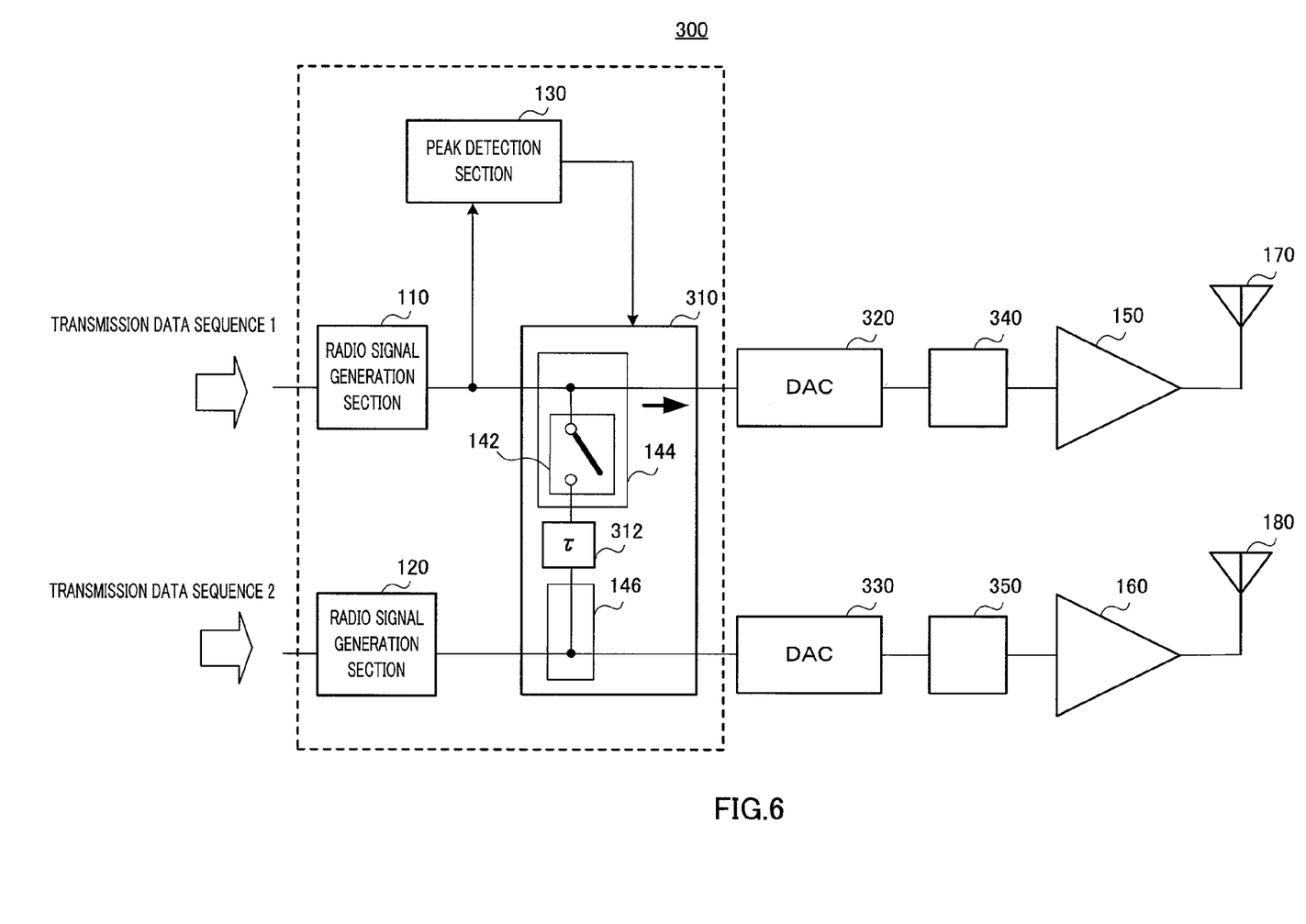
FIG. 6 is a block diagram showing another configuration of the MIMO transmitting apparatus according to Embodiment 3 of the present invention.

Furthermore, the processing in radio signal generation sections 110 and 120, peak detection section 130, branch switching section 310 can be performed digitally. FIG. 6 shows the configuration in which digital processing is performed. In the figure, the part surrounded by the dotted line shows a function block where digital processing is performed. When this configuration is adopted, radio signal generation sections 110 and 120 perform baseband signal processing. Then, output signals from branch switching section 310 are subject to D/A conversion in digital-to-analog converters (DACs) 320 and 330 and then converted to radio signals in radio signal converters 340 and 350.

INDUSTRIAL APPLICABILITY

The MIMO transmitting apparatus of the present invention provides an advantage of allowing high-efficiency power amplification even in a signal with a wide dynamic range or high PAPR, and is suitable for use in transmitting apparatuses in the next generation mobile base station apparatuses and terminal apparatuses.

The invention claimed is:

1. A multiple input multiple output transmitting apparatus comprising:
    a first antenna and a second antenna;
    a first amplifier that amplifies a signal received as input, to output the amplified signal to the first antenna;
    a second amplifier that amplifies a signal received as input, to output the amplified signal to the second antenna;
    a detection section that detects an envelop of a first transmission sequence signal; and
    a switching section that switches between inputting an entirety of the first transmission sequence signal to the first amplifier, and inputting part of the first transmission sequence signal provided by dividing power of the first transmission sequence signal together with a second transmission sequence signal to the second amplifier based on a comparison result between the envelop detection result of the first transmission sequence signal and a threshold value.

2. The multiple input multiple output transmitting apparatus according to claim 1, wherein, when the envelop detection result exceeds a threshold value, the switching section inputs the part of the first transmission sequence signal to the second amplifier such that an envelope of a first transmission sequence signal inputted to the first amplification section does not exceed the threshold value.

3. The multiple input multiple output transmitting apparatus according to claim 1, further comprising:
    a first variable gain amplifier that is provided on an input side of the first amplifier and amplifies an input signal of the first amplifier; and
    a second variable gain amplifier that is provided on the input side of the second amplifier and amplifies an input signal of the second amplifier,
    wherein the first variable gain amplifier and the second variable gain amplifier adjust gain according to a switching state in the switching section.

4. The multiple input multiple output transmitting apparatus according to claim 1, further comprising a delay addition section that, when the part of the first transmission sequence signal is inputted to the second amplifier together with the second transmission data sequence signal, relatively shifts a phase between a first transmission sequence signal inputted to the first amplifier and a first transmission sequence signal inputted to the second amplifier.

\* \* \* \* \*